United States Patent [19]

Meyer

[11] 3,740,918

[45] June 26, 1973

[54] DECORATIVE TRIM STRIP, FASTENER, AND METHOD OF MAKING SAME

[75] Inventor: Engelbert A. Meyer, Union Lake, Mich.

[73] Assignee: USM Corporation, Boston, Mass.

[22] Filed: June 23, 1971

[21] Appl. No.: 155,782

[52] U.S. Cl. .................. 52/717, 29/155 R, 52/312, 85/13
[51] Int. Cl. ............................................ B60r 13/04
[58] Field of Search ..................... 52/717, 716, 718, 52/312, 511; 85/49, 13, 11; 293/88, 61; 29/155 R

[56] References Cited
UNITED STATES PATENTS

| | | | |
|---|---|---|---|
| 3,291,516 | 12/1966 | Kavos | 293/88 X |
| 3,049,042 | 8/1962 | De Lynn | 85/49 X |
| 3,543,465 | 12/1970 | Jackson | 52/716 |
| 1,741,279 | 12/1929 | Bowman | 85/49 X |

FOREIGN PATENTS OR APPLICATIONS
386,892   1/1933   Great Britain ......................... 85/49

Primary Examiner—John E. Murtagh
Assistant Examiner—Carl D. Friedman
Attorney—Burton & Parker

[57] ABSTRACT

A decorative trim strip comprising an elongated channel-shaped base molding with a vinyl or other plastic decorative elongated trim piece adhesively secured to the base molding substantially throughout its length with fasteners projecting through the base molding at opposite ends of the trim piece with each fastener having a pair of tangs which are embedded in the trim piece and curled outwardly in situ therein without penetrating the decorative surface of the trim piece to retain the ends of the trim piece against the base molding preventing inadvertent end peeling of the trim piece from the molding. The method of constructing the trim strip and a fastener-applying gun are disclosed.

4 Claims, 8 Drawing Figures

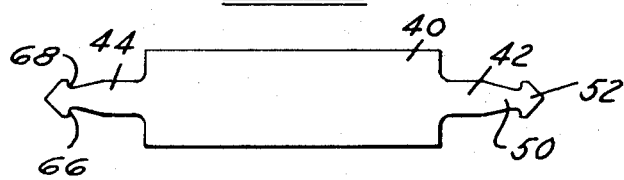
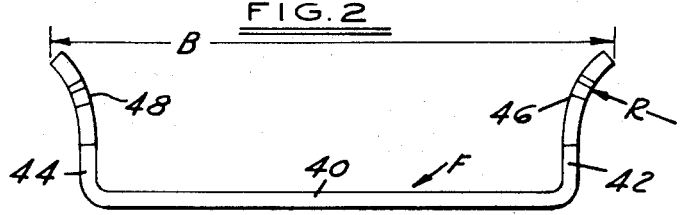
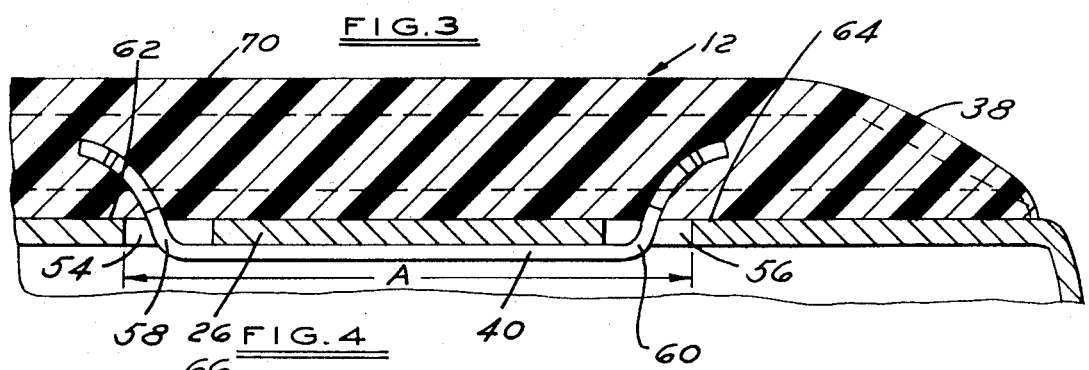
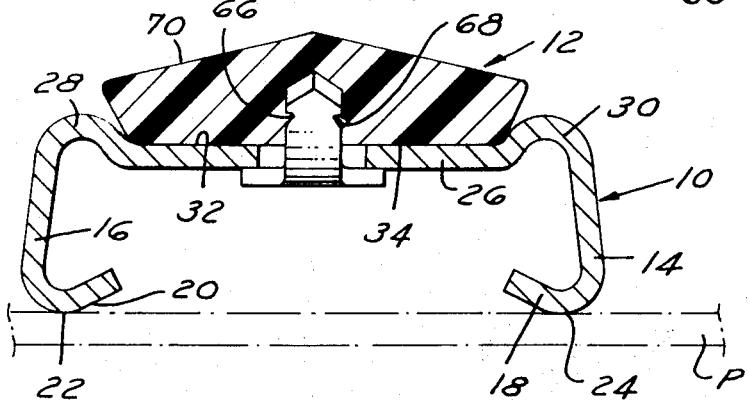
INVENTOR
ENGELBERT A. MEYER
BY
Burton & Parker
ATTORNEYS

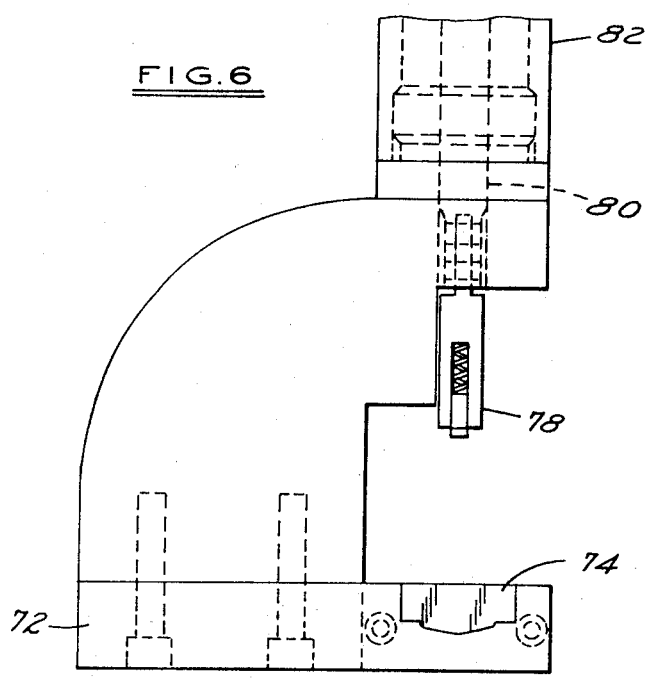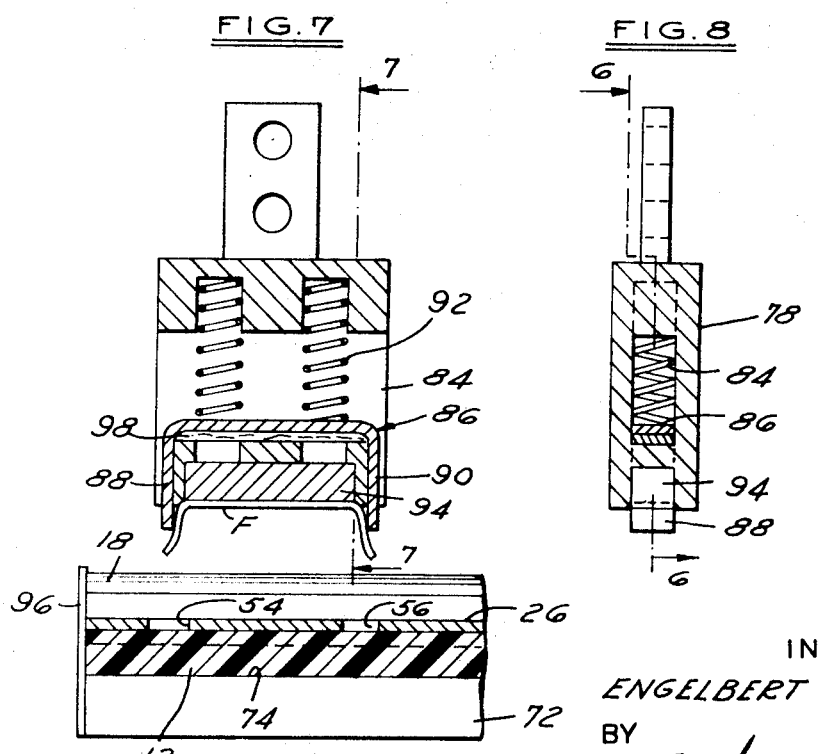

DECORATIVE TRIM STRIP, FASTENER, AND METHOD OF MAKING SAME

FIELD OF INVENTION

This invention relates to decorative trim, particularly decorative trim for automobiles, appliances or the like which comprises a base molding intended to be attached to the vehicle or appliance to extend therealong and which is provided with a decorative trim piece of colored vinyl or other plastic material intended to match or contrast with the color of the panel and wherein the trim piece is adhesively secured to the base molding.

BACKGROUND OF INVENTION

In the provision of decorative trim for automobiles, appliances and the like, designers have sought to provide trim which matches or contrasts with the color of the paint used on the vehicles or appliances, or which is textured and is highlighted by a bright surface finish separating the color or textured appearance from the surface of the vehicle or appliance. One approach to this has been the provision of a generally channel-shaped base molding of bright metal such as polished aluminum, stainless steel or chromium-plated material, which is positioned against the panel surface of the vehicle or appliance with the open side of the channel facing the panel surface and with the exterior of the bottom of the channel spaced outwardly from the panel surface. A decorative trim piece of matching or contrasting color with that of the painted panel surface extends along such exterior bottom of the channel-shaped base molding. Exposed marginal edges of the bottom and side walls of the base molding serve to separate and highlight the trim piece from the painted panel surface. Secure retention of this decorative trim piece to the base molding, particularly in the automotive applications, has been troublesome as the decorative trim piece is most usually formed of a vinyl or other plastic which is secured to the base molding by adhesive. As the trim piece is essentially exposed on three sides and at its ends on the exterior of the bottom of the base molding, it is subjected to influences which tend to cause it to peel off of the base molding, particularly at the opposite ends of the base molding. For example, when a vehicle passes through a car wash, or is subjected to periods of standing in direct sunlight, or the trim piece is brushed by a light sideswipe, the trim piece tends to loosen from the base molding.

As it is desired to maintain as low as possible the cost of such decorative trim treatment for the vehicles or appliances, the adhesive securement of the trim piece to the base molding has been found most desirable as such method of securement can be effected at low cost. However, the problem of the trim piece peeling from the base molding, particularly at opposite ends, has occasioned the apparent necessity of resorting to either unattractive supplemental securing devices or the use of a more expensive adhesive or a modification in the design of the base molding to capture the ends of the trim piece. Suggested solutions for supplemental securement of opposite ends of the trim piece utilizing fasteners have contemplated extending a fastener, such as a rivet, through the decorative surface of the trim piece and into the base molding to be riveted thereon. Such is undesirable because of the unattractiveness of such arrangement. The utilization of more expensive adhesives, or the redesigning of the base molding are preferably to be avoided as they increase the cost or limit the freedom of the designer in providing the appearance he desires.

SUMMARY OF INVENTION

This invention contemplates means for securing the trim piece to the base molding either as the primary or as a supplementary securement to the adhesive, by utilizing fasteners which are projected through the bottom wall of the base molding from the inside of its channel shape and which are embedded within the thickness of the trim piece and do not adversely affect the appearance of the exterior of the trim piece either as a result of their presence in the trim piece or as a result of the method by which they are installed. Such fasteners comprise generally U-shaped staple-like elements having a bight portion and outwardly extending curled legs or tang portions. The base molding is provided with a pair of apertures where the fastener is to be extended therethrough, which apertures are spaced apart sufficiently to allow variation in placement of the fasteners. Upon positioning a fastener coincident with such apertures and driving the tangs thereof uniformly into the trim piece, the tangs or legs curl outwardly and are embedded within the trim piece securely holding the trim piece to the base molding.

I have found that if the tangs of the fasteners are provided with arrowhead-shaped points that the retention power of the fasteners is increased from approximately seven pounds to twelve pounds in tension. The length of the tangs is such that in the absence of the outward curling during driving into the trim piece they would extend in some instances completely through the trim piece destroying the decorative appearance of its exterior surface. The method of assembly disclosed herein does not require the use of an anvil as is conventional with stapling applications and furthermore utilization of an anvil to effect curling of the tangs would require complete penetration of the trim piece thereby destroying its decorative surface.

I have also disclosed a fastener-applying gun which may be utilized for quickly and efficiently applying the fasteners to the base molding and trim piece.

In the drawings:

FIG. 1 is a plan view of one of the fasteners in its blank form prior to the final step in its manufacture;

FIG. 2 is a side elevation of a finished fastener prior to its insertion into the base molding and trim piece;

FIG. 3 is a cross-sectional view taken on the line 3—3 of FIG. 5 showing the fastener of FIG. 2 after the same has been inserted into the base molding and trim piece;

FIG. 4 is a cross-sectional view through the assembly shown in FIG. 3;

FIG. 5 is a plan view of an end section of a trim strip embodying the invention;

FIG. 6 is an end elevation of a gun for applying the fastener of FIG. 2 in making the trim strip shown in FIGS. 3 and 4;

FIG. 7 is a front elevation through the driving head of the gun of FIG. 6 showing the head in position to drive a fastener into a base molding and trim piece and is taken on the line 7—7 of FIG. 8; and FIG. 8 is a cross-sectional view taken on the line 8—8 of FIG. 7.

DESCRIPTION OF PREFERRED EMBODIMENT

A trim strip embodying the invention is shown in

FIGS. 3, 4 and 5 as including a generally channel-shaped base molding 10 of polished or otherwise bright metal such as stainless steel, aluminum or chrome plated material provided along its exterior bottom wall surface with a decorative vinyl or other plastic trim piece 12. The base molding has a pair of opposed side wall portions 14 and 16 which are inturned at their marginal edges as at 18 and 20 to provide surfaces 22 and 24 which are adapted to abut the painted surface of an automobile panel or of an appliance or the like to which the trim strip is to be secured. The base molding includes a bottom wall 26 extending between the side walls 14 and 16 and being joined thereto through an upset or rib-like wall configuration 28 and 30. The two upset wall configurations 28 and 30 define therebetween a supplementary channel within which the trim piece 12 is nested or received as shown in FIG. 4. When the base molding is secured to the automobile or appliance with the surface portions 22 and 24 abutting the automobile or appliance panel P (shown in phantom), the trim piece 12 is spaced outwardly from the panel by substantially the depth of the channel 10 and exposed for decorative purposes, and is highlighted or set off from the panel by the bright appearance of the ribs 28, 30 and the side walls 14 and 16, and lends decorative treatment to the automotive panel or appliance. The base molding 10 may be secured to the underlying panel P by any suitable fastening means such as that shown in my prior U. S. Pat. No. 3,188,730.

From FIG. 4 it will be noted that the trim piece is essentially exposed on three sides. For the purpose of securing the trim piece 12 to the base molding, it has been the practice heretofore to provide a layer of adhesive between the under surface 34 of the trim piece and the surface 32 of the bottom wall 26. Such adhesive extends from one end of the trim piece to the other and has as its purpose the securement of the trim piece to the base molding. However, it has been found in practice, that the trim piece tends to become dislodged from the base molding when secured only by the adhesive, such dislodgment being particularly troublesome at opposite ends of the trim piece and it has been found that even new automobiles in a show room have had the trim pieces drooping at opposite ends from the base molding.

The trim piece 12 is in practice formed of a vinyl or other plastic material of a color contrasting with or matching that of the painted surface of the vehicle body or appliance while the base molding is in practice formed of a bright metal. Both the base molding 10 and the trim piece 12 are in practice formed by extrusion processes or the like and prior to assembly the surfaces 32 and/or 34 are coated with an adhesive and then the surfaces juxtaposed to effect a bond therebetween.

In FIG. 3 only a fragment of the length of a molding assembly is shown adjacent one end thereof. In practice the width of the base molding often tapers in its end area as at 36 in FIG. 5 with the trim piece correspondingly tapered. The trim piece may also taper in height as at 38 in FIG. 3. In a typical molding strip the trim piece may be approximately one-eighth inch high or in other words may vary as between the solid and dotted outline of FIG. 3, and be one-half inch wide, and the base molding approximately 9/32 inch high and 25/32 inch wide.

To supplement the adhesive securement and prevent peeling of the trim piece from the base molding adjacent opposite ends of the trim piece, I have provided a fastener shown in FIGS. 1-4 which is generally U-shaped in cross section having a base or bight portion 40 of generally rectangular shape at opposite ends of which there are integral relatively narrower tangs 42 and 44, which are bent to extend upwardly from the base portion and are curled outwardly as at 46 and 48. In FIG. 1 I have shown the fastener after being blanked out but prior to bending the tangs. Each tang is provided with in inwardly tapering or narrow neck portion 50 terminating in an arrowhead shaped end 52. From substantially the commencement of the tapering portion 50 through it and the arrowhead shaped end 52, the tang is curled outwardly as shown in FIG. 2. The curled configuration is critical to satisfactory operation of the fastener as will be hereinafter apparent.

The base molding bottom wall 26 is provided with longitudinally spaced apart apertures 54 and 56 each of which may comprise an elongated slot. The longitudinal distance A between opposite remote ends of the slots exceeds the distance B between ends of the tangs. By projecting the ends of the tangs through the slots and driving the fastener toward the trim piece and bottom wall 26 of the base molding 10, the tangs will curl outwardly and tend to flatten toward the plane of the base or bight portion 40 such that when the fastener is fully driven into place with its base 40 juxtaposing the bottom wall 26 of the molding channel 10, the fastener will have assumed the position shown in FIG. 3. The oppositely directed outward curling action by the tangs as they are driven into the trim piece 12 occurs by virtue of the intial outwardly curled set given to the tangs as shown in FIG. 2 at 46 and 48. This initial set causes the tangs to curl further outwardly toward a more nearly parallel relationship with the base 40 as the tangs are forced into the trim piece.

It will be observed that while the curl radius at 46 and 48 of FIG. 2 remains substantially constant as compared with FIG. 3, the tangs have bent outwardly at the juncture 58 and 60 of the tangs with the base, and this is in an area of maximum tang width. As a result, the tangs will strongly resist bending back to their positions of FIG. 2 thereby securely holding the trim piece to the base molding. During the oppositely directed outward curling of the tangs and bending at points 58 and 60, the tangs tend to compress the trim piece toward the bottom wall 26 in the areas 62 and 64. The shoulders 66 and 68 behind the end of each tang resist pull-out of the fasteners from the trim piece and in combination with the compression of the trim piece on areas 62 and 64, securely hold the end of the trim piece to the base molding.

The securement of the fastener in the trim piece is accomplished without any penetration of the decorative surface 70 of the trim piece. This is the result of the fact that the tangs will, because of their initial curled configuration, curl or bend outwardly as previously described as the fastener is pressed into the strip and no anvil or the like, common in the stapling art, is required.

To facilitate securement of the fasteners in the trim strip and to insure their proper driving and uniform bending in the trim piece during driving, I have shown a fastener-applying gun in FIGS. 6–8 which includes a base member 72 having a recess 74 therein for receiving the trim strip in inverted position (the underside of the bottom wall 26 facing upwardly), an upright bracket 76 secured to the base and carrying a vertically reciprocable fastener-driving head 78 on the end of a piston rod 80 of a fluid pressure cylinder 82. The head 78 is slotted as at 84 and within the slot is a U-shaped fastener-embracing member 86 having arms 88 and 90. Spring means 92 urge the member 86 downwardly to embrace a fastener F held in the head by a magnet 94 which is pressed into a recess formed in the head beneath slot 84. Arms 88 and 90 insure that the fastener is properly aligned with the head and prevent premature outward bending of the tangs as the fastener is driven into the trim piece. During descent of the driving head, when the lower ends of the arms 88 and 90 engage the bottom wall 26 of the base molding, the guide member 86 is pushed upwardly into the head as the fastener F is driven into the trim piece. A trim strip having a squared-off end is shown located in the gun by a wall member 96 secured over one end of the recess 74. A fiber or other pad 98 cushions the return shock of the guide member as the head is raised.

It is to be understood that the gun disclosed can be adapted for high speed feeding of fasteners and trim strips to facilitate high production securement of fasteners in trim strips without departing from my invention.

Further it is to be understood that the radius R of the initial curl of the tangs 42 and 44 of the fastener F as shown in FIG. 2 can be varied as desired to insure that the outward bending of the tangs in situ in the trim piece during driving of the fastener into the trim piece will be sufficient to prevent penetration of the tangs through the decorative surface 70 of the trim piece.

What is claimed is:

1. A trim strip comprising: an elongated channel-shaped base molding of bright metal having a bottom wall and inturned longitudinal edges providing non-cutting panel engaging marginal edges, a decorative plastic trim piece extending longitudinally along and adhesively secured to the outside of the bottom wall of the base molding, a pair of longitudinally spaced apart apertures through the base molding beneath the trim piece, and a generally U-shaped fastener having a bight portion extending longitudinally between said apertures within the channel-shape and an integral tang at each end of the bight portion extending through the apertures into and curled outwardly in situ in the trim piece spaced from the decorative surface of the trim piece a distance such that the decorative surface is not upset thereby.

2. The invention defined in claim 1 characterized in that the apertures in the base molding are located beneath an end portion of the trim piece and the fastener is curled outwardly into the trim piece in said end portion thereof.

3. The invention defined in claim 1 characterized in that each tang of the fastener is in the shape of an arrowhead.

4. The method of making a trim strip comprising: providing an elongated bright surface generally U-shaped base molding having a pair of longitudinally spaced apart apertures through the bottom wall thereof, adhesively securing to the exterior of the bottom wall of the base molding in longitudinal alignment therewith an elongated decorative plastic trim strip, providing a generally U-shaped fastener having a bight portion with an upstanding integral outwardly curled tang at each end, aligning the tangs of the fastener with the apertures and while rigidly backing up the trim piece, driving the fastener thereinto through said apertures causing the tangs to curl outwardly in situ in the trim piece without breaking through the decorative surface of the trim piece.

* * * * *